UNITED STATES PATENT OFFICE.

JAS. C. BOOTH, OF PHILADELPHIA, PENNSYLVANIA.

IMPROVEMENT IN PROCESSES FOR REFINING GOLD.

Specification forming part of Letters Patent No. 7,661, dated September 24, 1850.

*To all whom it may concern:*

Be it known that I, JAMES C. BOOTH, of Philadelphia, in the county of Philadelphia, in the State of Pennsylvania, have invented a new and Improved and useful Mode or Process for Refining Gold and Separating it from Silver and other Metals; and I do hereby declare that the following is a full and exact description thereof.

The nature of my invention consists in the preparation of a solution of gold alloyed with silver or other metals, so as to convert them into chlorides, and a precipitation of metallic gold upon the chloride of silver and other insoluble chlorides; and in the subsequent reduction and extraction of the silver or other metals from those insoluble chlorides, or the direct extraction of their chlorides by solution, in the manner hereinafter set forth, so as to leave the gold pure.

To enable others to make and use my invention, I proceed to describe the manner of conducting the process and its operation.

First, I make a solution of gold containing silver and other metals, so as to convert them into chlorides; second, I precipitate gold in the metallic state from the solution, so that it mixes with undissolved chloride of silver and other insoluble chlorides; third, I dissolve out the chloride of silver and other insoluble chlorides from the gold by means of a special menstruum, herein described, or I reduce the chloride of silver and other insoluble chlorides to metals by zinc or iron and sulphuric or muriatic acid and dissolve out the metals reduced from their insoluble chlorides from the gold by nitric or sulphuric acid.

The process for making the solution is thus: To one part, by weight, of granulated gold—that is, gold melted and cast into water—I take about one part of common salt, three-fourths, or about three-fourths of one part, of nitrate of potassa, or one-half of one part of nitrate of soda, and about one and one-half parts of oil of vitriol. I put the salts and gold into a wooden vessel, to be presently described, and, covering them with water, I admit steam into the liquid until it attains a boiling-heat. The wooden vessel may be any ordinary vessel or vat, made with staves or otherwise, of any convenient size, the best proportion for which is a depth as great as or greater than its diameter, having about one-fourth of its cover fastened on the top and provided with a wooden trough passing into a chimney or other flue and the rest of the cover movable, so as to charge or empty the vat the more conveniently. The object of the trough is to carry off any fumes that might arise to annoy the operator during the process, although little or none can arise except steam.

Instead of the arrangement of the cover and trough here indicated, the vat, or a series of them, may be set into a horizontal flue, which is connected with a chimney, and the vat or vats covered loosely with boards during the process.

A stout piece of wood, bored through its entire length and open at each end, is secured vertically to the inner side of the vat and a steam pipe or tube passed into the upper opening. The steam admitted through the tube passes down through the wooden pipe and escapes freely into the liquid, heating it to any temperature required for the process. When the water is sufficiently heated the oil of vitriol, previously diluted with several parts of water, is added by degrees in successive portions, according as I observe the action to progress. The gradual addition of sulphuric acid generates muriatic and nitric acids or their elements slowly, so that they spend their full force upon the gold without escaping, thus preventing any annoyance to the operator from injurious vapors, while at the same time their more powerful nascent state is employed in effecting combination and solution. I thus continue the addition of sulphuric acid and the admission of steam, say, for three or four hours, or until all or nearly all the gold is dissolved. The solution will then contain terchloride of gold and the sulphate of soda, or sulphate of soda and of potassa, while chloride of silver and other insoluble chlorides will remain undissolved, and, if the process shall be conducted too hastily, also a small amount of gold. Sulphates or chlorides of other metals, if present, are also in solution.

The advantages of the above method of solution are the use of cheap materials, avoiding the cost of previously preparing muriatic or nitric acid; cheapness in the use of vessels of wood in which solution or combination is effected; the use of steam for heating, which is safe, economical, and under control, and when blown directly into the liquid also promotes solution by agitation; the gradual development of the acids with its attendant advantages, as previously mentioned.

The precipitation is thus: The precipitation of metallic gold is effected in the same vessel in which the solution is produced, and may be performed as soon as the solution is completed. For the above proportion of gold—say one part—I employ about five parts of crystallized copperas, which I prefer putting into the liquid gradually in the state of powder, although it may be dissolved in water and poured in, and continue the application of heat by blowing in steam until all the precipitant has been added, occasionally pouring in a little muriatic or sulphuric acid to prevent the precipitation of peroxide of iron or a basic salt of the peroxide. In this way the whole of the gold will be precipitated in the metallic state as a fine powder, which a continuance of heat will collect into a closer and more compact precipitate. After stopping off the steam a sufficient repose of the liquid of from one to several hours will allow all the metallic gold and chloride of silver to collect at the bottom of the vessel. The liquid above the precipitate is then decanted, or drawn off by a siphon or some other convenient manner, and run into a suitable vat, to be further treated, if considered desirable, as will be described below. The precipitate may be once or twice washed in the same vessel used for solution and precipitation by pouring in water, allowing the precipitates to settle, and then decanting or drawing off the liquid; or it may be directly thrown upon a filter, and then washed with water until the water passes off colorless and gives a neutral test.

The advantages of this mode of precipitation are economy in the use of the cheap material of copperas, rapidity of execution, complete precipitation of all the gold present in the solution, and in such a state that it will yield a soft and malleable gold free from brittleness when it is subsequently fused, the avoidance of all danger of loss which would result from drawing off or decanting a solution of gold from the chloride of silver or of transferring it to another vessel. By this method of precipitation the copperas or protosulphate of iron is converted into a mixture of sesquisulphate and sesquichloride of iron, which are in the liquor drawn off.

Copperas may be again obtained from the liquid after being drawn off by putting into it bars or scraps of metallic iron, by which the sesquioxide of iron is reduced to protoxide, and then crystallizing out the copperas and adding either the crystallized copperas or the concentrated liquid without crystallization to the next solution of gold in order to precipitate it.

Although there is scarcely any economy in repreparing copperas, either crystallized or dissolved from the solution, yet it may have this advantage, that if the least particle of gold or of chloride of silver, through carelessness in operation or through accident, should have been drawn off with the liquid it will then be recovered; but any possible loss of gold in this way, or of chloride of silver in solution, may also be entirely obviated by drawing off the liquid into a large vat, and then diluting it largely with water, whereby chloride of silver will precipitate and will collect together with the gold at the bottom of the vessel after sufficient repose.

The process of dissolving out the chloride of silver and other insoluble chlorides is thus: The mixed metallic gold and chloride of silver are either partly washed in the solution-vat or wholly washed on a filter, and then thrown into a wooden vat lined with lead. Granulated metallic zinc or scraps of iron to the amount of about one-third of the quantity of silver and of other metals forming insoluble chlorides, originally in the gold, are then thrown into the same lead-vat, and water and sulphuric acid are added, and the whole is occasionally stirred. The chloride of silver is thus reduced to metallic silver. The gold is not attacked, and the excess of zinc or iron, if any, is dissolved out by sulphuric acid. If iron has been used to reduce chloride of silver, the solution of copperas thus obtained may be used to precipitate another solution of gold. After drawing off the solution of zinc as closely as convenient from the reduced silver and gold the latter are thrown upon a filter and thoroughly washed with water until the water ceases to give an acid reaction. The mixed metallic gold and silver are next treated in vessels of glass or stone ware by pure nitric acid, which dissolves out the silver and other metals, if present, and leaves the gold. By drawing off the liquid and filtering and washing the remaining gold the gold is separated from silver and other metals, if present. The gold is melted in the usual manner. The silver is precipitated from its solution by common salt, as chloride of silver, which is reduced by zinc or iron and sulphuric and muriatic acid, as in the usual parting process.

Instead of dissolving out the reduced silver by nitric acid, it may also be dissolved out by heating the mixed silver and gold with oil of vitriol in cast-iron vessels. The solution of silver is precipitated by common salt or metallic copper, according to usual known methods.

Although I prefer and claim as part of my invention the use of vessels of wood for making solutions of alloyed gold, yet vessels of porcelain, stoneware, or of glass may be used, which may be heated by steam, in a water bath, in a sand bath, or over the naked fire. Moreover, the form of the vessel may be varied. It might be made square, or oval, or round. It may be shallower or deeper; but I prefer the form I have described. The solution of gold may also be effected in a similar manner to that above described in vessels of wood, as follows: I take one part of alloyed gold, about three parts of strong muriatic acid of commerce, and three-fourths of one part of nitrate of potassa, or one-half of one part of nitrate of soda. I put the salt and gold, with a little water, into a wooden vessel like that before described, and pass steam into it. I then add about one-third of muriatic acid, still heating it, and after that add the remaining two-thirds of the muriatic acid gradually until solution is effected, as before.

The precipitation of metallic gold, reduction of chloride of silver, and dissolving out the metallic silver and other metals are effected as before described. Vessels of porcelain, stoneware, or glass may also be employed in this variation of the process, and heated in the manner described.

It is not necessary that the salt should be first put into the vessel, for the whole of the muriatic acid may be put in at once and steam applied until it is well heated, and then nitrate of potassa or of soda gradually added.

The mode of dissolving the gold may be further varied by putting one part gold and one part common salt into a vessel of wood, porcelain, stoneware, or glass, with a little water, heating the whole, and then adding strong nitric acid gradually until two and a half parts of nitric acid have been added.

The subsequent precipitation of metallic gold, reduction of chloride of silver, solution, and separation of metallic silver are the same as have been described. Another known method of dissolving gold may also be employed by the use of a mixture of muriatic and nitric acids, which process requires the use of vessels of porcelain, stoneware, or glass; or, if wooden vessels are employed, muriatic acid may be first put into such vessels, heated, and nitric acid gradually added. The subsequent steps of the process are the same as have been described.

The above processes may be still further varied by the use of chlorate of potassa instead of nitrate of soda or of potassa.

The second stage of the process—the precipitation of metallic gold in the solution—may also be effected by adding to the solution containing one part of gold, one part of sugar, molasses, or starch and a quantity of carbonated or caustic potassa or soda or caustic lime sufficient to superneutralize the free acid, keeping the whole in a boiling state until all, or nearly all, the gold is precipitated. If the precipitation be not immediately complete, it will complete itself by standing for some time. The liquid is drawn off from the gold after settling, the precipitate is washed, and then treated as above described for the separation of gold and chlorides.

The third stage of the operation may be so varied that the chloride of silver and other insoluble chlorides are directly dissolved out from the metallic gold by any convenient solvent—such as hyposulphite of lime or of soda or caustic aqua-ammonia. The washed gold is melted as usual. The silver is obtained from the solution by known methods, and if it contain gold they may be separated by nitric or sulphuric acid.

Some of the advantages of this invention for refining alloyed gold are that the largest quantities may be operated upon in a shorter time than is now practicable when acids alone are used; that this is the cheapest known method of refining gold, as the materials or chemical agents employed in this invention are of less cost than those used in any known plan; that the apparatus is one of easy and economical construction; that the cost of previously preparing muriatic or nitric acid, or both, may be saved by the use of the salts from which these acids are generated, instead of the acids themselves; that the processes under this invention may be conducted in cities and densely-populated places and districts without inconvenience or injury to the inhabitants; that they will yield a soft and malleable gold entirely free from silver and other metals, which is not the case in the usual parting methods; that this invention will obviate the loss of interest attendant upon the keeping of a large amount of silver on hand for the purpose of refining gold, as is required in the usual processes, for in my invention the use of silver is not required; that by preventing the too rapid generation of volatile acid all waste in that article is avoided and the workmen are enabled to proceed in their labors without any injury from the acids. Beside all these advantages, the gold, when refined by this invention, is left in a suitably soft state, free from all brittleness, and ready at once for alloy for coining, which is frequently not the case with the known processes.

I do not claim the solution of gold in a mixture of nitric and muriatic acids previously prepared, nor the methods of precipitation by copperas, nor by sugar and alkali, nor the reduction of chloride of silver by zinc and acid, unless the solution and precipitation be made in the same vessel without transfers. Small quantities of gold have been refined by a mixture of nitric and muriatic acids; but this method has not been carried out on a large scale, and has been deemed impracticable to a great extent on account of the cost of these acids, the noxious fumes arising from the process of solution, and the liability to loss in carrying or transferring a solution of gold. In the usual parting process nitric acid always leaves small quantities of silver and other metals when they have been melted with gold unless a very large excess of acid is employed, and in that event there would be no advantage in the process, as it would be too costly on a manufacturing or large scale.

What I claim as my invention, and desire to secure by Letters Patent, is—

1. The process of dissolving alloyed gold for refining it by developing nitric acid or both nitric and muriatic acids gradually from their salts, in the manner and for the purpose set forth in the specification.

2. The process of precipitating gold from its solution and removing therefrom the insoluble chlorides, as set forth.

3. The process of refining alloyed gold without the use of silver, so as to form a solution of gold and other metals, and a residue of chloride of silver and of other insoluble chlorides, and then precipitating metallic gold upon those insoluble chlorides in the same vessel without transfer after the solution is effected, and afterward dissolving out the insoluble chlorides from the gold or reducing the insoluble chlorides to the metallic state in the wet way and dissolving out the metals from the gold, all in the manner hereinbefore described; but I do not claim dispensing with the use of silver, except as a part of the main process herein described.

4. The process, as described, of dissolving alloyed gold in wooden vessels, which may be made of any dimensions corresponding to the extent of the operation.

5. The process, as described, of dissolving alloyed gold by blowing steam directly into the solvent liquids.

JAS. C. BOOTH.

Witnesses:
  LOUIS F. TOUCHERES,
  HENRY M. MOFFIT,
  W. THOMPSON.